United States Patent [19]

Narita

[11] Patent Number: 4,953,090
[45] Date of Patent: Aug. 28, 1990

[54] HYDRAULIC PRESSURE CONTROL FOR REDUCING ENGAGEMENT SHOCK OF AUTOMATIC TRANSMISSION

[75] Inventor: Yasushi Narita, Yokohama, Japan

[73] Assignee: Nissan Motor Co., Ltd., Japan

[21] Appl. No.: 89,860

[22] Filed: Aug. 27, 1987

[30] Foreign Application Priority Data

Sep. 4, 1986 [JP] Japan .................. 61-206696

[51] Int. Cl.⁵ .......................................... B60K 41/22
[52] U.S. Cl. ................... 364/424.1; 74/866; 74/867; 192/3.31
[58] Field of Search ............... 364/424.1; 74/866, 867, 74/868, 869; 192/4 A, 9, 0.077, 0.032, 0.033, 0.034, 3.31

[56] References Cited

U.S. PATENT DOCUMENTS

| | | | |
|---|---|---|---|
| 4,502,354 | 3/1985 | Suzuki et al. | 74/866 |
| 4,559,599 | 12/1985 | Habu et al. | 364/424.1 |
| 4,582,182 | 4/1986 | Takeda et al. | 192/3.31 |
| 4,667,540 | 5/1987 | Yagi | 74/866 |
| 4,680,988 | 7/1987 | Mori | 364/424.1 |
| 4,691,285 | 9/1987 | Takeda | 364/424.1 |
| 4,715,145 | 12/1987 | Takeda et al. | 74/866 |
| 4,744,031 | 5/1988 | Takeda et al. | 74/866 |
| 4,783,743 | 11/1988 | Yashiki et al. | 74/867 |

FOREIGN PATENT DOCUMENTS 57-47056 3/1982 Japan .

Primary Examiner—Parshotam S. Lall
Assistant Examiner—Christopher L. Makay
Attorney, Agent, or Firm—Leydig, Voit & Mayer

[57] ABSTRACT

A hydraulic pressure control system for reducing engagement shock of a frictional element in an automatic transmission, comprises an electromagnetically operated valve for generating a hydraulic pressure supplied to the frictional element, and a control unit for controlling the hydraulic pressure such that the level of the hydraulic pressure generated is adjusted to a target value. In the control unit, the difference in the torque applied to the transmission output shaft owing to a shifting operation is determined, the length of time from the beginning of an inertia phase to the end of the inertia phase is determined, the mean rate of change in the torque of the output shaft during the length of time is determined, and the target value is determined such that the torque on the transmission output shaft varies at the mean rate of change during the inertia phase.

5 Claims, 6 Drawing Sheets

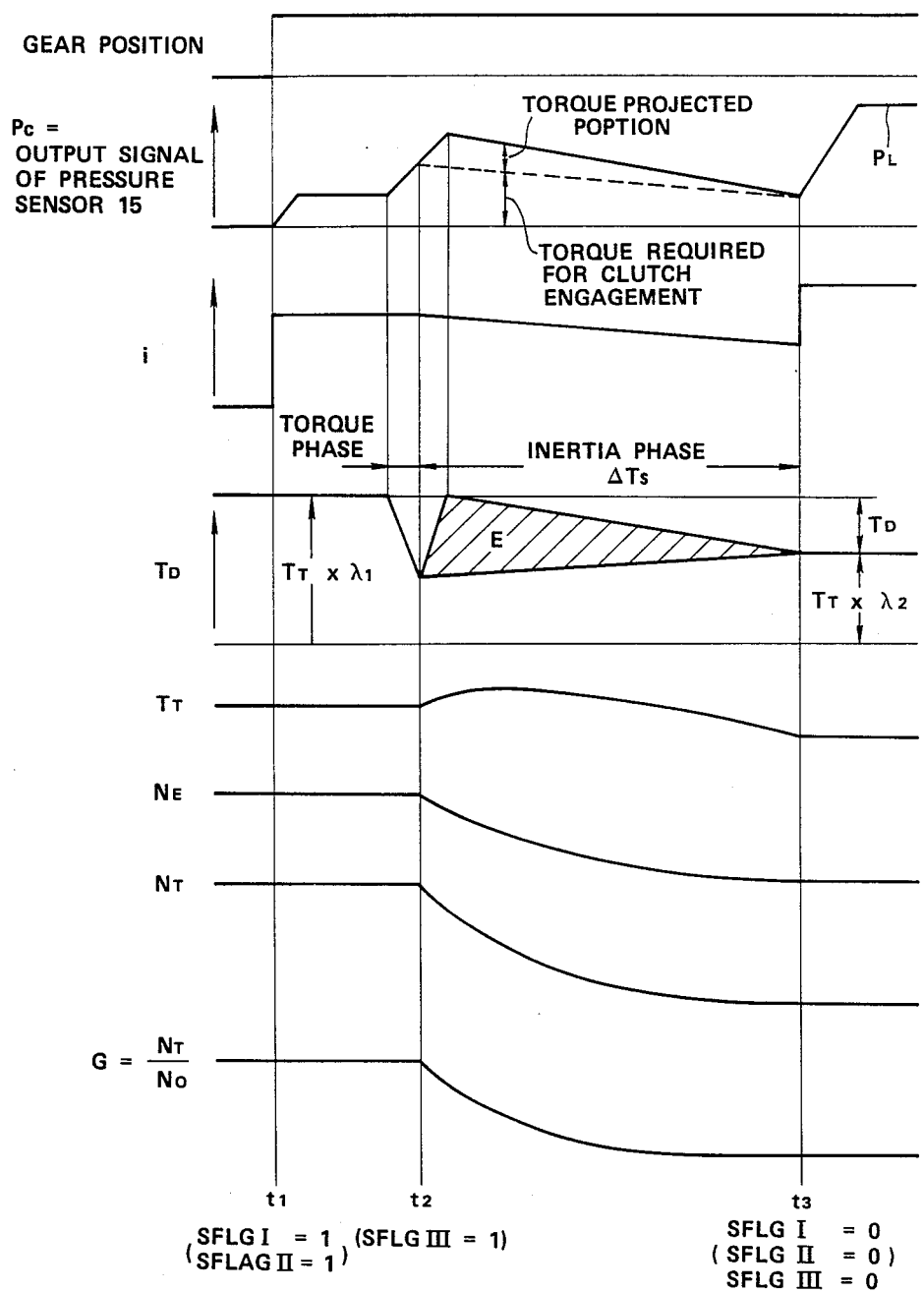

HYDRAULIC PRESSURE CONTROL FOR REDUCING ENGAGEMENT SHOCK OF AUTOMATIC TRANSMISSION

BACKGROUND OF THE PRESENT INVENTION

The present invention relates to a hydraulic pressure control system for controlling shocks occurring upon engagement of a torque transmitting frictional element that is engaged to effect shifting between gear positions in an automatic transmission.

Vehicular automatic transmissions are known wherein in response to the vehicle operating conditions shifting between gear positions is effected automatically by supplying hydraulic fluid pressure to one or more selected frictional elements. U.S. Pat. No. 4,502,354 (corresponding to JP A-No. 57 47056) discloses a hydraulic pressure control system wherein in order to reduce shift shock during a change in gear position, the hydraulic pressure (a line pressure) for actuating a frictional element is maintained equal to the magnitude of a target hydraulic pressure for a predetermined holding time.

According to this known control system, there is no fine control of the hydraulic fluid pressure during a period when the hydraulic fluid pressure returns to the level of the line pressure so that there occurs a change in transmission output torque during this period and this change is felt as a shift shock.

An object of the present invention is to provide a hydraulic pressure control system which can alleviate a change in transmission output torque when the hydraulic fluid pressure returns to the line pressure.

SUMMARY OF THE INVENTION

The present invention is a hydraulic pressure control system for reducing engagement shock of a frictional element in an automatic transmission. The control system comprises a hydraulic pressure generating means in the form of an electromagnetically operated valve for generating a hydraulic pressure supplied to the frictional element, and a control unit for controlling the hydraulic pressure generating means such that the level of the hydraulic pressure generated is adjusted to a target value. In the control unit, a torque difference on the transmission output shaft owing to a shifting operation is determined, the length of time from the beginning of an inertia phase to the end of the inertia phase is determined, the mean rate of change in the torque difference with-respect to the length of time is determined, and the target value is determined such that the torque on the transmission output shaft varies at the mean rate of change during the inertia phase.

BRIEF DESCRIPTION OF THE DRAWINGS

FIG. 10 is a timing diagram showing various signals as a function of time.

DESCRIPTION OF THE EMBODIMENT

Figure 1:
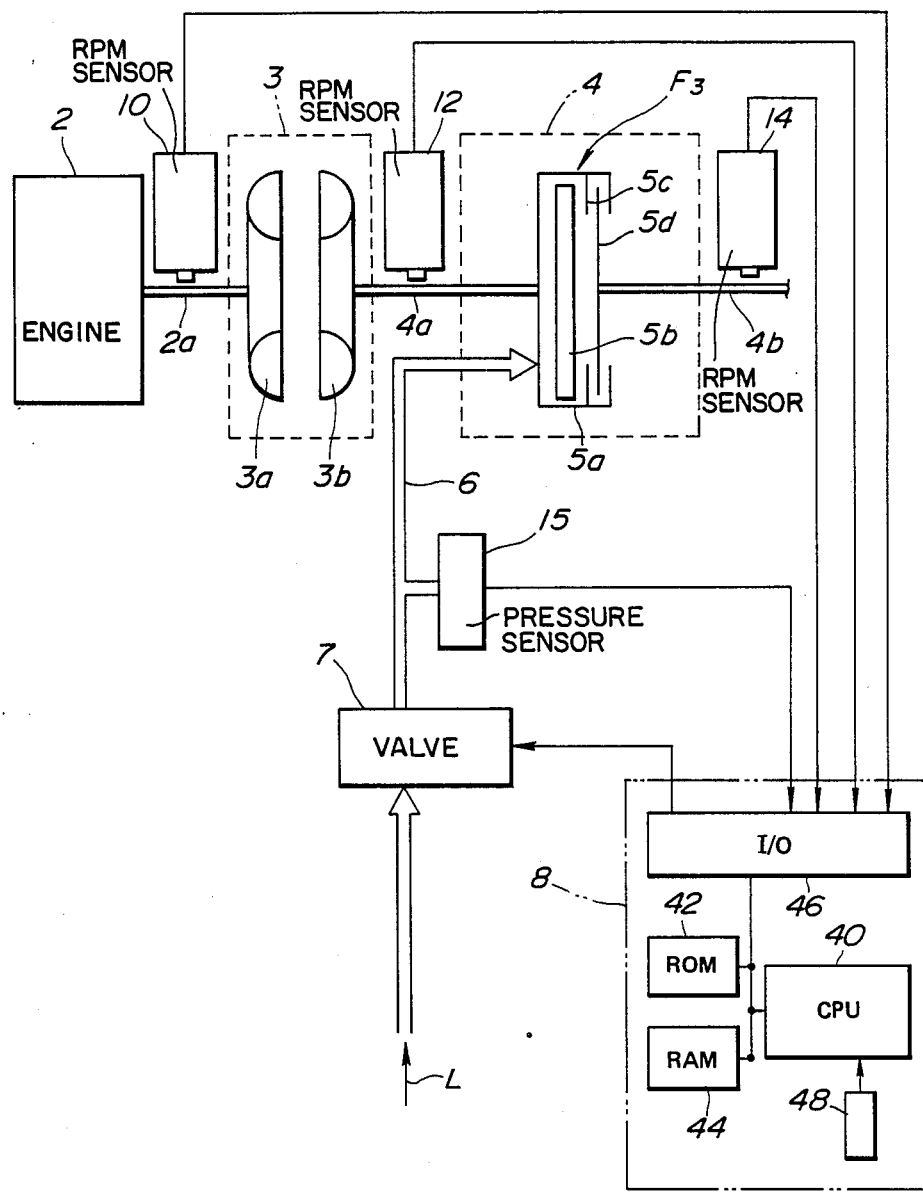
FIG. 1 is a schematic block diagram showing an embodiment of a hydraulic pressure control system according to the present invention.

FIG. 1 is a block diagram of a hydraulic pressure control system according to the present invention. Reference numeral 2 designates an engine, 3 a hydrodynamic torque transmitting device in the form of a torque converter, and 4 a gear train for an automatic transmission. The torque converter 3 includes a pump impeller $3a$ drivingly connected to a crankshaft $2a$ of the engine 2 and a turbine runner $3b$ drivingly connected via a turbine shaft to a transmission input shaft $4a$.

Figure 2:
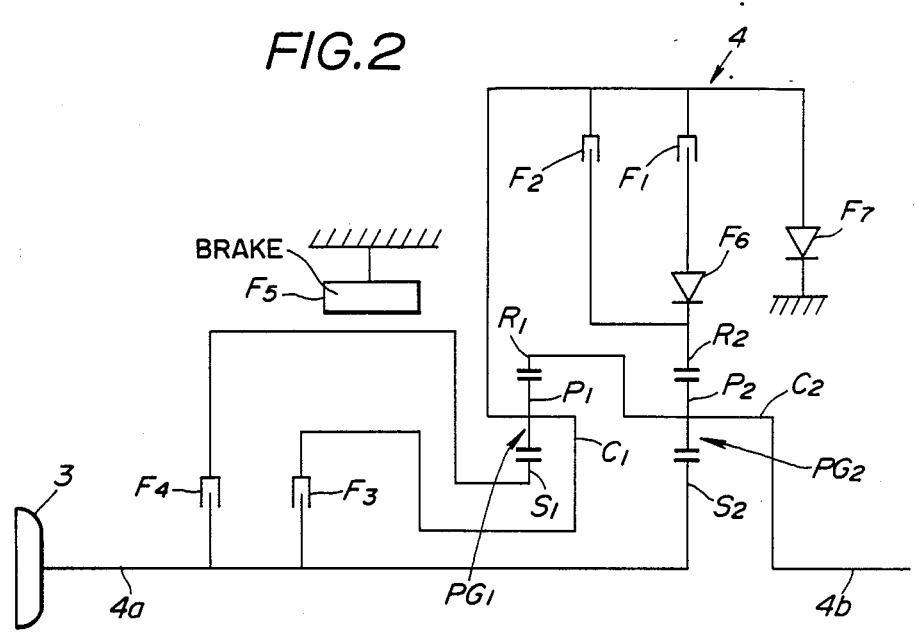
FIG. 2 is a schematic view of a power train of an automatic transmission associated with the control system.

FIG. 2 shows one example of the structure of the gear train 4. As shown in FIG. 2, the automatic transmission is connected to the torque converter 3 via the input shaft $4a$, and it comprises a transmission output shaft $4b$, a first planetary gear set $PG_1$, and a second planetary gear set $PG_2$. The first planetary gear set $PG_1$ includes a sun gear $S_1$ connectable via a clutch $F_4$ to the transmission input shaft $4a$, a ring gear $R_1$, planetary pinions $P_1$ meshing both with the sun and ring gears $S_1$ and $R_1$, and a carrier $C_1$ rotatably supporting the planetary pinions $P_1$ The carrier $C_1$ is connectable via a clutch $F_3$ to the transmission input shaft $4a$. The second planetary gear set $4b$ includes a sun gear $S_2$ connected to the transmission input shaft $4a$, a ring gear $R_2$, planetary pinions $P_2$ meshing both with the sun and ring gears $S_2$ and $R_2$, and a carrier $C_2$ rotatably supporting the planetary pinions $P_2$. The carrier $C_2$ is connected to the ring gear $R_1$ and also to the transmission output shaft $4b$. The carrier $C_1$ is connectable via a clutch $F_2$ to the ring gear $R_2$, it is also connectable via an overrunning clutch $F_6$ when a clutch $F_1$ is engaged. A brake $F_5$ is provided to hold the sun gear $S_1$ stationary. One-way clutch $F_7$ is operatively disposed between the carrier $C_1$ and a stationary portion of the transmission.

The above mentioned frictional elements are engaged and disengaged in a predetermined schedule to provide four forward ratios and one reverse ratio as shown in the following table.

TABLE 1

|   | $F_1$ | $F_6$ | $F_2$ | $F_5$ | $F_3$ | $F_7$ | $F_4$ |
|---|---|---|---|---|---|---|---|
| 1 | o | o | (o) |   |   | o |   |
| 2 | o | o | (o) | o |   |   |   |
| 3 | o | o | (o) |   | o |   |   |
| 4 | o |   |   | o | o |   |   |
| R |   |   |   |   |   |   | o |

In the above table, the sign "O" indicates that a particular frictional element is engaged, and thus no sign means that the particular frictional element is released.

The sign "(O)" means that a particular frictional element is engaged during engine brake operation.

In the hydraulic pressure control system according to the present invention, any of the torque transmitting frictional elements $F_1$ to $F_7$ may be hydraulically controlled. In the illustrated embodiment in FIG. 1, clutch $F_3$ is hydraulically controlled so as to reduce shocks occurring when clutch $F_3$ is engaged to effect shifting between different gear positions in the automatic transmission. Although not specifically shown in FIG. 1, clutch $F_3$ is a multi-plate clutch which is designed to be engaged through firm engagement of drive plates $5c$ and driven plates, only one being shown at $5d$, under a bias force by a piston $5b$ as a result of a stroke of the piston $5b$ in response to pressure build-up within a cylinder $5a$. The clutch $F_3$ is released as a result of discharge of hydraulic fluid from the cylinder $5a$.

A hydraulic fluid supply line 6 is connected to the cylinder $5a$. A line fluid pressure designated by arrow L is supplied to the hydraulic fluid supply line 6. An actuator in the form of an electromagnetically operated proportional type valve 7 is installed in the hydraulic fluid supply line 6 to control the flow rate of hydraulic fluid supplied to the cylinder $5a$ of the clutch $F_3$. This valve 7 is activated in response to an output signal from a microcomputer-based control unit 8.

Figure 3:
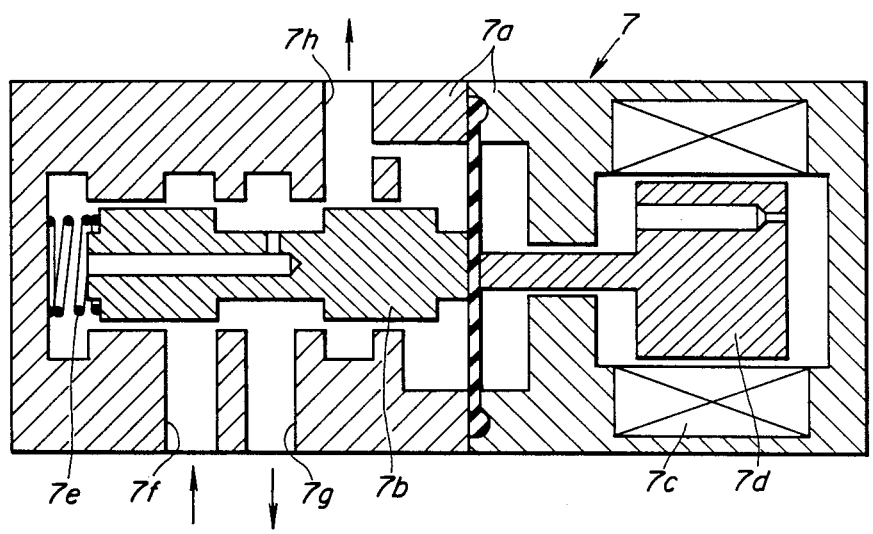
FIG. 3 is a diagrammatic sectional view illustrating a proportional type solenoid operated actuator.

The structure of the above mentioned electromagnetically operated valve 7 is diagrammatically illustrated in FIG. 3. The electromagnetically operated valve 7 includes a valve body $7a$, a spool $7b$, and a plunger $7d$ that is electromagnetically activated by a solenoid $7c$. When the plunger $7d$ is activated, the plunger $7d$ is moved to the left as viewed in FIG. 3, urging the spool $7b$ against a biasing action of a spring $7e$. The valve body $7a$ is provided with an inlet port $7f$, an outlet port $7g$, and a drain port $7h$. The inlet port $7f$ is communicable with a source of line pressure so that hydraulic fluid flows via the inlet port $7f$ and the outlet port $7g$ to the cylinder $5a$. In the illustrated position of the spool $7b$, fluid communication between the outlet port $7g$ and the inlet port $7f$ and fluid communication between the outlet port $7g$ and the drain port $7h$ are blocked. If the spool $7b$ is moved from the illustrated position to the left as viewed in FIG. 3, the outlet port $7g$ is allowed to communicate with the inlet port $7f$, allowing the supply of hydraulic fluid to the cylinder $5a$ of the clutch $F_3$. If the spool $7b$ is moved from the illustrated position to the right as viewed in FIG. 3, the outlet port $7g$ is allowed to communicate with the drain port $7h$, allowing the discharge of hydraulic fluid from the cylinder $5a$ of clutch $F_3$. As will be noted from the FIG. 3, the hydraulic pressure within the outlet port $7g$ is applied via an axial bore formed through the spool $7b$ to a spring chamber where the spring $7e$ is arranged, thus assisting the spring $7e$ in biasing the spool $7b$ to the right in FIG. 3.

Figure 7:
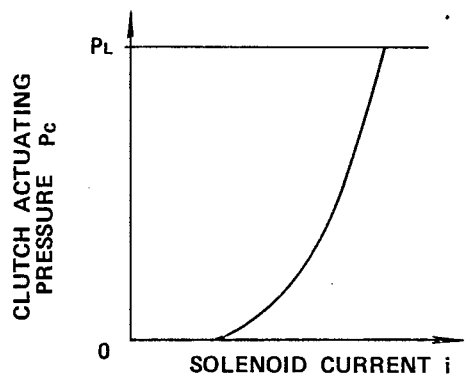
FIG. 7 shows the relationship between output pressure and input solenoid current which is stored in a ROM of a microcomputer.

FIG. 7 shows the relationship between the output hydraulic pressure $P_C$ generated within the outlet port $7g$ and the electric current i flowing through the solenoid $7c$. As will be noted from this relationship, there is a one-to-one correspondence between the output hydraulic pressure and the electric current flowing through the solenoid $7c$.

Referring back to FIG. 1, three rotational speed sensors 10, 12 and 14 are provided. One sensor is an engine crankshaft rotational sensor 10 arranged to measure the rotational speed of the crankshaft $2a$, another sensor is a transmission input shaft rotational speed sensor 12 arranged to measure the rotational speed of the transmission input shaft $4a$ (or the rotational speed of the turbine $3b$ of the torque converter 3). The other, sensor is a transmission output shaft rotational speed sensor 14 arranged to measure the rotational speed of the transmission output shaft $4b$. A hydraulic pressure sensor 15 is arranged to measure the output hydraulic pressure of the electromagnetically operated valve 7. Output signals of sensors 10, 12, 14, and 15 are supplied to the control unit 8. An output signal of the control unit 8 is supplied to the electromagnetically operated valve 7. The control unit 8 includes a microcomputer having a central processor unit 40 (CPU) which operates based on the control program and control data stored in a read only memory 42 (ROM). The output signals of the sensors 10, 12, 14, and 15 are converted by corresponding unillustrated converters (for example A/D converters), respectively, into binary coded values. These binary coded values are stored by a random access memory 44 (RAM) via an input/output interface 46 (abbreviated as I/O). The CPU 40 operates based on the stored data and the stored program within the RAM 44 and ROM 42 so as to control the hydraulic fluid pressure for actuating the frictional elements and generates through the I/O 46 the solenoid drive signal supplied to the solenoid $7c$ of the electromagnetically operated valve 7.

The mode of operation of the hydraulic pressure control system as mentioned above using the microcomputer will be explained with reference to the flowcharts of control programs shown in FIGS. 4, 5, and 6.

Figure 4:
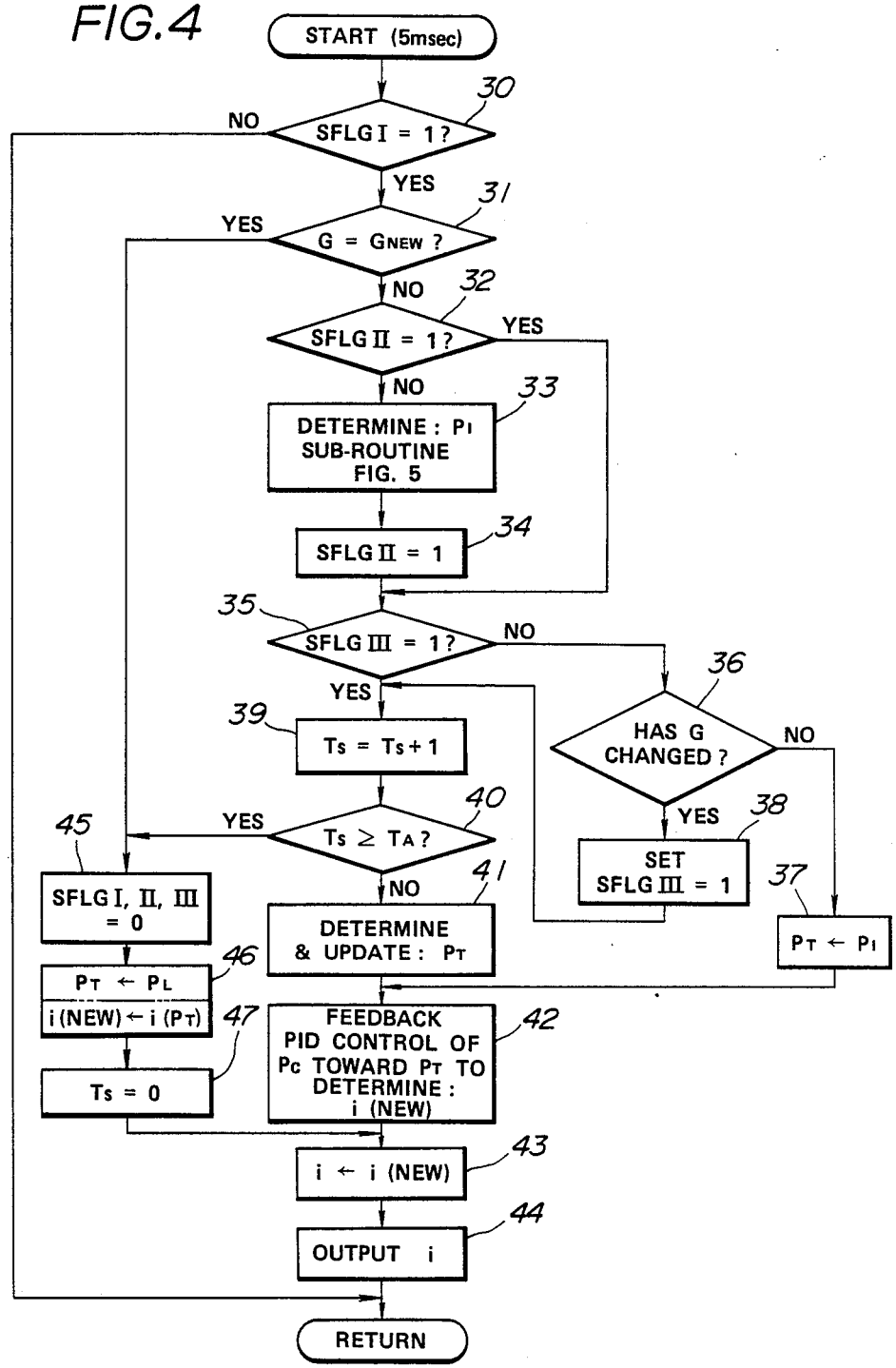
FIG. 4 is a flowchart of the operation of the control system.

FIG. 4 is a flowchart of a program showing an interrupt routine used in cooperation with an unillustrated main program, for controlling the line pressure. The program shown in FIG. 4 operates in response to an interrupt signal which is generated at regular, predetermined intervals, such as 5 msec, by a timer 48.

Figure 5:
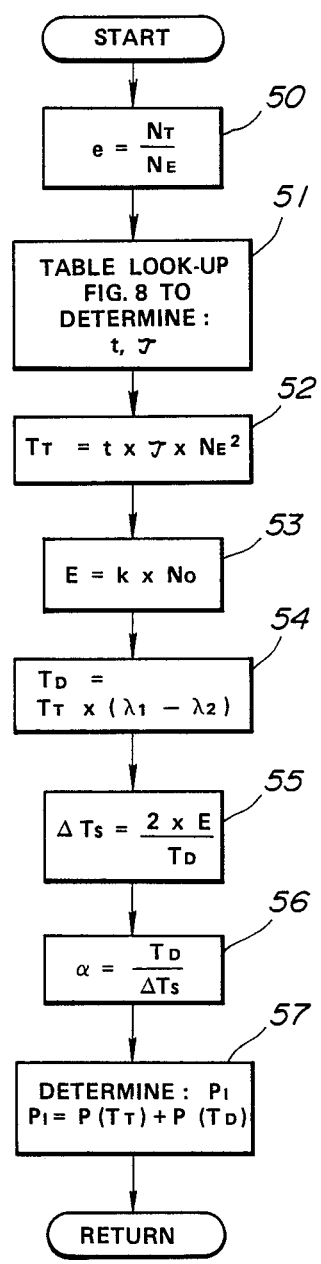
FIG. 5 is a flowchart of the operation of the control system to determine the magnitude of an initial hydraulic pressure and the length of time required for a change between gear positions.

FIG. 5 is a flowchart of a program showing a subroutine for determining values of an initial hydraulic pressure $P_I$ and a time $T_T$ required for shifting between gear positions.

Figure 6:
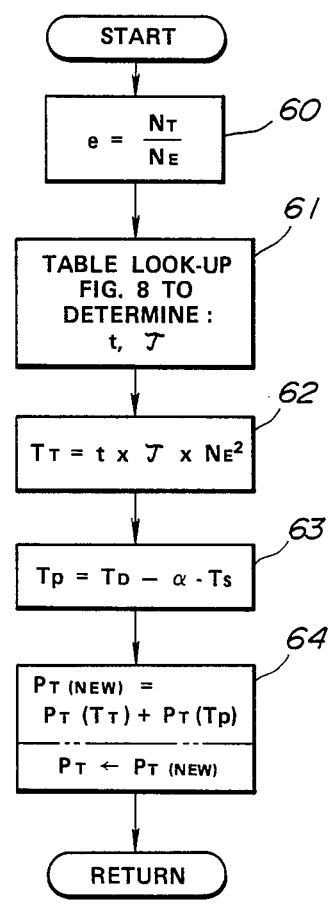
FIG. 6 is a flowchart of the operation of the control system to determine a target hydraulic fluid pressure.

FIG. 6 is a flowchart of a program showing a subroutine for determining a target hydraulic pressure $P_T$.

The following table sets forth the basic meaning of characteristic address names used in the flowcharts of FIGS. 4, 5, and 6.

TABLE 2

| Address Name | Content |
| --- | --- |
| SFLG I | assumes a value 1 in response to a change (a shift command) in a gear position signal which is shown in FIG. 10. |
| SFLG II | assumes a value 1 indicating that an initial hydraulic pressure has been calculated. |
| SFLG III | assumes a value 1 when a gear ratio $N_T/N_O$ has started varying indicating that a shifting operation has entered an inertia phase. |
| G | stores the value of the gear ratio $N_T/N_O$. |
| $G_{NEW}$ | stores the value of a gear ratio which is predetermined for each gear position. |
| $T_S$ | a shift timer. |
| $\Delta T_S$ (delta Ts) | stores the time required for an inertia phase of shifting operation. |
| $T_A$ | stores the time required for shifting operation |

TABLE 2-continued

Figure 8:
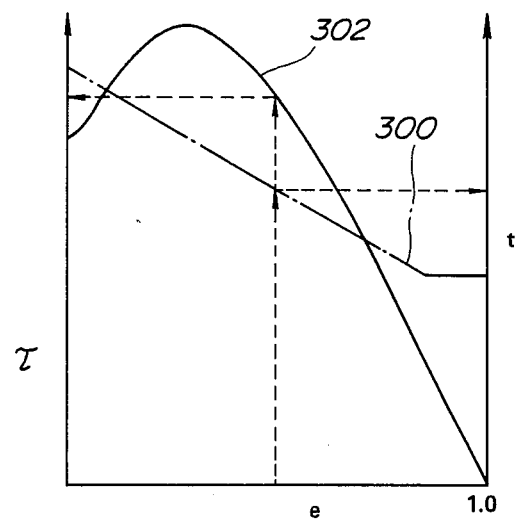
FIG. 8 shows performance characteristic curves against a variation in a speed ratio of an input member of the torque converter to an output member thereto, illustrating data stored in the ROM.

| Address Name | Content |
|---|---|
| | initiated by a shift command. |
| $P_I$ | stores the value of an initial hydraulic pressure. |
| $P_T$ | stores the value of a target hydraulic pressure. |
| i | stores the value of the current flowing through the solenoid 7c shown in FIG. 3. |
| e | stores the value of a speed ratio $N_T/N_E$. |
| t | stores the value of the torque ratio of torque converter 3, which value is retrievable by table look-up of data as illustrated in FIG. 8. |
| $\tau$ (tau) | stores the value of an input torque capacity coefficient of the torque converter 3, which value is retrievable by table look-up of data as illustrated in FIG. 8. |
| $N_E$ | stores the engine rotational speed measured by sensor 10. |
| $N_T$ | stores the transmission input shaft rotational speed or the turbine rotational speed measured by sensor 12. |
| $N_O$ | stores the transmission output shaft rotational speed measured by sensor 14. |
| $T_T$ | stores the value of the torque transmitted to the transmission input shaft 4a by the torque converter 3, which value results from calculation of t x (tau) x $N_E^2$. |
| E | stores the value of enegy inherent with a change in inertia during inertia phase. |
| $T_D$ | stores the difference in transmission output torque generated by a shifting operation. |
| $\lambda_1$ (lamda one) | stores the gear ratio before shifting. |
| $\lambda_2$ (lamda two) | stores the gear ratio after shifting. |

Hereinafter, the programs shown in FIGS. 4, 5, and 6 will be explained.

Referring to FIG. 4, in step 30, a decision is made whether the content of address SFLG 1 is set equal to 1. Before proceeding further with explanation of the control programs, a brief explanation will be given how address SFLG 1 is set equal to 1. The microcomputer determines the proper gear position based on output signals of various position sensors provided to detect positions assumed by various shift valves, such as a 1–2 shift valve, a 2–3 shift valve and a 3–4 shift valve. SFLG 1 is set equal to 1 in response to a predetermined change in gear position from one gear to another gear, such as, from the second gear to the third gear. If the above-mentioned shift valves are not used, a gear shift table stored in the ROM 42 is used. The table is utilized to store digital values corresponding to data of gear ratios. The computer utilizes the table to perform a table look-up operation to determine the proper gear as a function of vehicle speed value and throttle opening degree.

In step 30, if the content of the address SFLG I is not equal to 1, the control returns to the main program. If address SFLG I is set equal to 1, the program goes to step 31 where a decision is made whether the content of address G is set equal to the content of the address $G_{NEW}$. Although not shown in FIG. 4 for simplicity there are steps to transfer a proper predetermined gear ratio value to address $G_{NEW}$ corresponding to the gear position determined by the computer, to read output signals of the rotational speed sensors 12 and 14 via the I/O 46 and store the data as digital values in addresses $N_T$ and $N_O$, respectively, and to calculate $N_T/N_O$ and store the result in address G. A variation in the content of address G is illustrated in FIG. 10. In step 31, if the content of address G is not equal to the content of $G_{NEW}$, the program goes to step 32, while if the content of address G is equal to the content of $G_{NEW}$, the program goes to step 45. It is readily seen that the content of the address G becomes equal to the content of address $G_{NEW}$ upon completion of the particular gear shifting operation. In step 32, a decision is made whether address SFLG II is set equal to 1. If the content of address SFLG II is not equal to 1, the program proceeds to step 33 where the subroutine shown in FIG. 5 is executed to determine an initial hydraulic pressure value to be stored at address $P_I$. Then, the program goes to step 34 where the content of address SFLG II is set equal to 1, and then to step 35 where a decision is made whether the content of SFLG III is set equal to 1. If, in step 32, a decision is made that the content of address SFLG II is set equal to 1, the program jumps to step 35 bypassing the steps 33 and 34.

Figure 9:
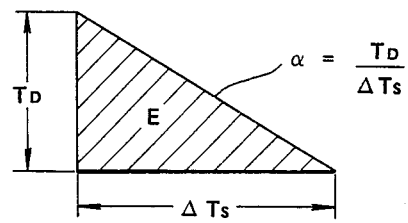
FIG. 9 shows the relationship between an inertia compensating hydraulic pressure $P_I$ against a variation of a vehicle speed, illustrating data stored in the ROM.

FIG. 5 illustrates subroutine to determine the initial hydraulic pressure. In step 50, the output signals of the rotational speed sensors 10 and 12 are read via the I/O 46 and the results are stored in addresses $N_E$ and $N_T$, respectively, and the CPU 40 performs calculation of the equation $N_T/N_E$ and stores the result in address e. After step 50, the program goes to step 51 where the computer performs a table look-up operation using the content of the address e. Two tables are stored in the ROM 42 for this operation. One is a torque ratio table as illustrated by dashed line 300 in FIG. 8, and the other is an input torque capacity coefficient table as illustrated by solid line 302 in FIG. 8. The result of the table look-up operation of the torque ratio table 300 is stored in address t, and the result of the table look-up operation of the input torque capacity coefficient table 302 is stored in address ($\tau$ tau). In the subsequent step 52, the, computer performs calculation of the equation $t \times \tau \times N_E^2$ and stores the result in address $T_T$. The content of address $T_T$ indicates the turbine torque applied to the transmission input shaft 4a. Then, the program goes to step 53 where the amount of energy (E) inherent in a change in inertia for the change in gear position is determined by calculating the equation $E = k \times N_O$, where k represents a constant predetermined for the given change in gear position. In the subsequent step 54, the CPU 40 calculates the equation $T_D = T_T \times (\lambda_1 - \lambda_2)$ to determine the torque difference before and after the gear shifting (see FIG. 10 also). In step 55, the ROM 40 calculates the equation $\Delta Ts = 2 \times E/T_D$ to determine the length of time required for the inertia phase. This equation is derived from an assumption that the amount of energy E is equal to half the product of $T_D$ and $\Delta Ts$ (delta Ts). This assumption is visualized by a right triangle as shown in FIG. 9. The area of the right triangle represents the amount of energy E, the height thereof represents the torque difference $T_D$, and the length thereof represents the time required for inertia phase operation $\Delta T_S$. In the subsequent step 56, the CPU 40 determines the mean rate of change of torque $\alpha$ (alpha) during the inertia phase operation by calculating the equation $\alpha = T_D/\Delta T_S$ which is based on the assumption illustrated in FIG. 9. Finally, the program finally goes to step 57 where the initial hydraulic pressure is determined and stored in address $P_I$. The initial hydraulic pressure is the sum of a clutch actuating hydraulic pressure value required to cause the clutch to generate a minimum required gripping force for the turbine torque value stored in the address $T_T$ and a clutch actuating hydraulic pressure value required to cause the clutch to generate a further gripping force for the torque difference stored in address $T_D$. In order to obtain the first mentioned clutch actuating hydraulic fluid pressure value, the computer performs a table look-up operation of a Table, stored in the ROM 42, which contains the first actuating pressure as a function of turbine torque. In order to obtain the second mentioned hydraulic pressure value, the computer performs a table look-up operation of a table, stored in the ROM 42, which contains the second actuating pressure as a function of torque difference. After step 57, the control returns to step 34 shown in FIG. 4.

In step 34, address SFLG II is set equal to 1. In the subsequent step 35, a decision is made whether address SFLG III is set equal to 1. As mentioned in the TABLE 2, address SFLG III is set equal to 1 upon commencement of the inertia phase operation so that address SFLG III is not equal to 1 before the shifting operation enters the inertia phase operation. Thus, the program goes from step 35 to step 36 where a decision is made whether the content of address G has changed. Since the content of address G represents a gear ratio, i.e., the ratio of turbine rotational speed $N_T$ to output shaft rotational speed $N_O$, the fact that the content of address G has changed indicates the start of the inertia phase. As will be understood from FIG. 10, the content of address G stays unchanged until the inertia phase starts so that the decision made in step 36 is negative initially until the inertia phase begins. Thus, the program goes to step 37 where the content of the address is set to the content of the address $P_T$. In other words, the initial hydraulic pressure value determined in step 33 is kept set as a target hydraulic pressure value in step 37 until the inertia phase begins.

When the shifting operation enters the inertia phase, the program goes from step 36 to step 38 where address SFLG III is set equal to 1. After the address SFLG III has been set equal to 1, the program keeps going from the step 35 to step 39 in the subsequent run. In step 39, a shift timer Ts is increased by 1. The purpose of this step is to measure the time elapsed after entry into the inertia phase. In the subsequent step 40, a decision is made whether the content of the shift timer Ts is greater than or equal to a predetermined length of time $T_A$ that is longer than the shift time represented by the content of address $\Delta T_S$ (delta Ts) for the fail-safe purposes. If, in step 40, it is determined that the content of the shift timer Ts is still less than content of the address $\Delta T_S$ (delta Ts), the program goes to step 41 where the subroutine shown in FIG. 6 is executed to determine a target hydraulic pressure value to be stored in address $P_T$.

The subroutine of FIG. 6 will now be explained. In step 60, the output signals of the revolution speed sensors 10 and 12 are read via the I/O 46 and results are stored in the addresses $N_E$ and $N_T$, respectively, and the CPU 40 performs calculation of the equation $N_T/N_E$ and stores the result in address e. After step 60, the program goes to step 61 where the computer performs a table look-up operation using the content of address e. The two tables, i.e., the torque ratio table illustrated by the dashed line 300 in FIG. 8 and the input torque capacity coefficient table illustrated by the solid line 302 in FIG. 8 are used for the operation. The result of the table look-up operation of the torque ratio table 300 is stored in address t, and the result of the table look-up operation of the input torque capacity coefficient table 302 is stored in address $\tau$ (tau). In the subsequent step 62, the computer performs calculation of the equation $t \times \tau \times N_E^2$ and stores the result in address $T_T$. The content of address $T_T$ indicates the turbine torque applied to the transmission input shaft, 4a. In the subsequent step 63, the computer calculates the equation $T_P = T_D - \alpha T_S$ to determine the torque projected portion during the inertia phase and stores the result in address $T_P$. In the subsequent step 64, the target hydraulic pressure is determined and the content of address $P_T$ is updated with the result. The target hydraulic pressure is the sum of the clutch actuating hydraulic pressure value required to cause the clutch to generate a minimum required gripping force for the turbine torque value stored in address $T_T$ and a clutch actuating hydraulic pressure value required to cause the clutch to generate a further gripping force for the torque projected portion stored in address $T_P$. The first mentioned and second hydraulic pressure values are represented by $P_T(T_T)$ and $P_T(T_P)$ in step 64. The result is stored in address $P_{T(NEW)}$ and the content of address $P_{T(NEW)}$ is transferred to the content of address $P_T$. Then, the control returns to step 42 shown in FIG. 4.

Referring back to FIG. 4, in step 42, the target hydraulic pressure value stored in address $P_T$ which has been obtained in the previously mentioned step 37 or 41 and an actual hydraulic pressure value stored in address $P_C$ are used to determine the error or deviation therebetween. Based on the deviation, the computer performs a PID (P: proportional, I: integral, D: differential) calculation and stores the result. An electric current value corresponding to this result is stored in address i(NEW). In the subsequent step 43, the content of address i(NEW) is set to the content of address i. In step 44, the content of address i is output and supplied via the I/O 46 to the solenoid 7c. As a result of the feedback control, the actuating hydraulic pressure $P_C$ is brought into agreement with the target hydraulic pressure value determined in step 37 or 41.

If, in step 31, the decision indicates that the particular shifting operation has been completed, i.e., that G is not equal to $G_{NEW}$, the program goes through steps 45, 46, and 47. In step 45, all of addresses SFLG I, SFLG II, and SFLG III are cleared and thus their contents are set equal to 0. In step 46, the target hydraulic pressure represented by the content of address $P_T$ is set equal to the maximum value. This means that the line pressure $P_L$ is set as the target hydraulic pressure. In step 46, the solenoid current value corresponding to the maximum value as represented by the content of address $P_T$ is determined and stored in address i(NEW). In the subsequent step 47, the content of the shift timer Ts is cleared and set equal to 0. Thereafter, the program goes through steps 43 and 44 and the content of the address i is supplied via the I/O 46 to the solenoid 7c. As a result of this process, the , actuating hydraulic pressure $P_C$ is set equal to the level of the line pressure $P_L$. Thus, this prevents the clutch F₃ from slipping after the shifting operation has been completed. Hence, the transmission loss by the clutch is minimized.

Should the CPU 40 fail to recognize the completion of the particular shifting operation in step 31, the program would go from step 40 to the above-described steps 45, 46, and 47 when the content of the shift timer Ts became greater than or equal to the predetermined time $T_A$. Thus, this provides a safeguard against brazing of the clutch due to excessive heat generated by friction.

The upshift mode of operation of the system will be explained with reference to FIG. 10. Since during a period from time $t_1$ when a shift command occurs to time $t_2$ when the inertia phase begins, the engine rotational speed $N_E$ and the turbine rotational speed $N_T$ are kept constant, the initial hydraulic pressure value represented by the content of $P_I$ is constant, so the solenoid current i supplied to the solenoid 7c during this period is constant as illustrated. During this period, the clutch actuating hydraulic pressure $P_C$ is initially held at a value corresponding to the bias force of a clutch return spring during a lost-stroke motion of the clutch piston until the clutch starts engaging. Upon termination of the lost-stroke motion of the clutch piston, the clutch actuating hydraulic pressure $P_C$ starts increasing toward the initial hydraulic pressure value represented by the content of the address $P_I$, causing the clutch F₃ to proceed to engage. As a result, a drop in the output shaft torque takes place.

During the inertia phase period $\Delta T_S$ beginning at time $t_2$ and ending at time $t_3$ when the shifting operation is completed, the electric current i corresponding to the target hydraulic pressure represented by the content of address $P_T$ that is determined by the subroutine shown in FIG. 6 is supplied to the solenoid 7c, so the clutch actuating hydraulic pressure $P_C$ is controlled in such a manner as to cause the output shaft torque to vary smoothly without causing any torque difference. Thus, energy E can be dissipated gradually. As a result, the occurrence of shift shock is effectively suppressed.

Furthermore, there is no torque difference before and after time $t_3$ when the shifting operation is completed, and the output shaft torque $T_D$ is brought into agreement with the value of torque determined by $T_T \times \lambda_2$. Thus, the amount of shock caused by the torque variation upon the completion of the shifting operation is effectively suppressed.

What is claimed is:

1. A hydraulic pressure control system for reducing engagement shock of a frictional element in an automatic transmission, the automatic transmission having a transmission output shaft and a transmission input shaft, the frictional element changing its state to effect a shifting between two gear positions in the automatic transmission, the control system comprising:
    pressure generating means for generating a hydraulic pressure supplied to the frictional element; and
    pressure control means for controlling said pressure generating means,
    said pressure control means including means for determining a difference between torque applied to the transmission output shaft before the shifting and torque on the transmission output shaft after the shifting, determining length of time from beginning to end of an inertia phase, determining mean rate of change in the torque applied to the output shaft during the length of time, varying a target value at said mean rate of change during the inertia phase, and adjusting the level of the hydraulic pressure to said target value.

2. A hydraulic pressure control system for reducing engagement shock of a frictional element during shifting in an automatic transmission, the automatic transmission having a transmission input shaft and a transmission output shaft, the transmission input shaft being drivingly connected to a turbine runner of a hydrodynamic torque transmitting device which has a pump impeller drivingly connected to a crankshaft of an engine, said control system comprising:
    pressure generating means for generating a hydraulic pressure supplied to the frictional element;
    first sensor means for generating a first output signal indicative of rotational speed of the crankshaft of the engine;
    second sensor means for generating a second output signal indicative of rotational speed of the transmission input shaft;
    third sensor means for generating a third output signal indicative of rotational speed of the transmission output shaft;
    a control unit receiving said first, second and third output signals of said first, second and third sensor means and generating an output signal to be supplied to said pressure generating means,
    said control unit including memory means for storing data as to operating characteristics of the hydrodynamic torque transmitting device versus speed ratio of the rotational speed of the crankshaft of the engine to the rotational speed of the transmission input shaft,
    said control unit also including means for performing operations based on said data stored in said memory means to determine amount of torque transmitted to the transmission input shaft, determining difference between torque on the transmission output shaft before the shifting and torque applied to the transmission output shaft after the shifting, determining length of time from beginning to end of an inertia phase, determining mean rate of change in the torque applied to the transmission output shaft with respect to the length of time, varying a target value at said mean rate of change during the inertia phase, and adjusting the level of the hydraulic pressure generated to said target value.

3. A hydraulic pressure control system for reducing engagement shock of a frictional element during shifting in an automatic transmission, the automatic transmission having a transmission input shaft and a transmission output shaft, the transmission input shaft being drivingly connected to a turbine runner of a hydrodynamic torque transmitting device which has a pump impeller drivingly connected to a crankshaft of an engine, said control system comprising:
    pressure generating means for generating hydraulic pressure supplied to the frictional element;
    first sensor means for generating a first output signal indicative of rotational speed of the crankshaft of the engine;
    second sensor means for generating a second output signal indicative of rotational speed of the transmission input shaft;

third sensor means for generating a third output signal indicative of rotational speed of the transmission output shaft;

a control unit receiving said first, second and third output signals of said first, second and third sensor means and generating an output signal to be supplied to said hydraulic pressure generating means, said control unit including memory means for storing data as to operating characteristics of the hydrodynamic torque transmitting device versus speed ratio of the rotational speed of the crankshaft of the engine to the rotational speed of the transmission input shaft, said control unit also including means for performing operations based on said data stored in said memory means to determine amount of torque transmitted to the transmission input shaft, determining difference between the torque applied to the transmission output shaft before the shifting and the torque applied to the transmission output shaft after the shifting, determining mean rate of change in the torque applied to the transmission output shaft during the length of time, varying a target value in response to said amount of torque transmitted to the transmission input shaft and said mean rate of change, and adjusting the level of the hydraulic pressure generated to said target value.

4. A hydraulic pressure control system as claimed in claim 3, wherein said mean rate of change is obtained by dividing said torque difference by said length of time.

5. A hydraulic pressure control system as claimed in claim 4, wherein the product of said mean rate of change and the elapse of time from the beginning of said inertia phase is subtracted from said torque difference to give a torque projected portion, and said target value is the sum of a function of said amount of torque and a function of said torque projected portion.

* * * * *

UNITED STATES PATENT AND TRADEMARK OFFICE
CERTIFICATE OF CORRECTION

PATENT NO. : 4,953,090

DATED : August 28, 1990

INVENTOR(S) : Yasushi Narita

It is certified that error appears in the above-identified patent and that said Letters Patent is hereby corrected as shown below:

Claim 3, column 12, line 2, after "shifting," insert --determining length of time from beginning to end of an inertia phase,--.

Signed and Sealed this

Twenty-eighth Day of January, 1992

Attest:

HARRY F. MANBECK, JR.

Attesting Officer

Commissioner of Patents and Trademarks